United States Patent [19]
Valdenaire

[11] Patent Number: 5,967,933
[45] Date of Patent: Oct. 19, 1999

[54] AUTOMATIC CONTINUOUSLY VARIABLE POSITIVE MECHANICAL TRANSMISSION WITH ADJUSTABLE CENTRIFUGAL ECCENTRIC WEIGHTS AND METHOD FOR ACTUATING SAME

[76] Inventor: Jean Valdenaire, Combes Benoît - Roches-les-Blamont, 25310 Herimoncourt, France

[21] Appl. No.: 08/732,424

[22] PCT Filed: May 4, 1995

[86] PCT No.: PCT/FR95/00580

§ 371 Date: Nov. 1, 1996

§ 102(e) Date: Nov. 1, 1996

[87] PCT Pub. No.: WO95/30848

PCT Pub. Date: Nov. 16, 1995

[30] Foreign Application Priority Data

May 4, 1994 [FR] France ................................. 94/05654

[51] Int. Cl.⁶ ............................................. F16H 33/18
[52] U.S. Cl. ............................................ 475/255; 475/170
[58] Field of Search .................................. 475/255, 266, 475/267, 257, 254, 169, 170

[56] References Cited

U.S. PATENT DOCUMENTS

| | | | |
|---|---|---|---|
| 1,701,823 | 2/1929 | Rhodes | 475/255 |
| 1,741,862 | 12/1929 | Lyman | 475/255 |
| 2,564,211 | 8/1951 | O'Hara | 475/255 |
| 3,363,483 | 1/1968 | Osman | 475/255 |

FOREIGN PATENT DOCUMENTS

| | | | |
|---|---|---|---|
| 619845 | 4/1927 | France | 475/255 |
| 842760 | 6/1939 | France . | |
| 850411 | 12/1939 | France | 475/255 |
| 82664 | 2/1935 | Switzerland | 475/255 |
| 729406 | 4/1980 | U.S.S.R. | 475/255 |
| 523442 | 7/1940 | United Kingdom | 475/255 |
| 995305 | 6/1965 | United Kingdom . | |

*Primary Examiner*—Khoi Q. Ta
*Attorney, Agent, or Firm*—Davis and Bujold

[57] ABSTRACT

The invention relates to an automatic continuously variable positive mechanical transmission, making it possible to avoid using a hydrodynamic torque converter and a switchable gearbox. A planetary unit (44) linking an input shaft (30), transmitting a working torque CM, to an output shaft (31) transmitting a load torque CR. A reaction torque RC resting on a fixed point (35) of the case is added to the working torque in the planetary unit (44) via two successive planetary centrifugal devices (36, 37) with eccentric weights. The second centrifugal device (37) permanently balances the three torques CM, CR and RC. The first centrifugal device (36) transmits the reaction torque CR to the second which it sets using a setting of the eccentricity for its weights. Such a transmission can drive the output shaft at a continuously variable speed between zero and a speed equal to or greater than that of the input shaft. It is applied to driving vehicles or variable speed machines.

14 Claims, 8 Drawing Sheets

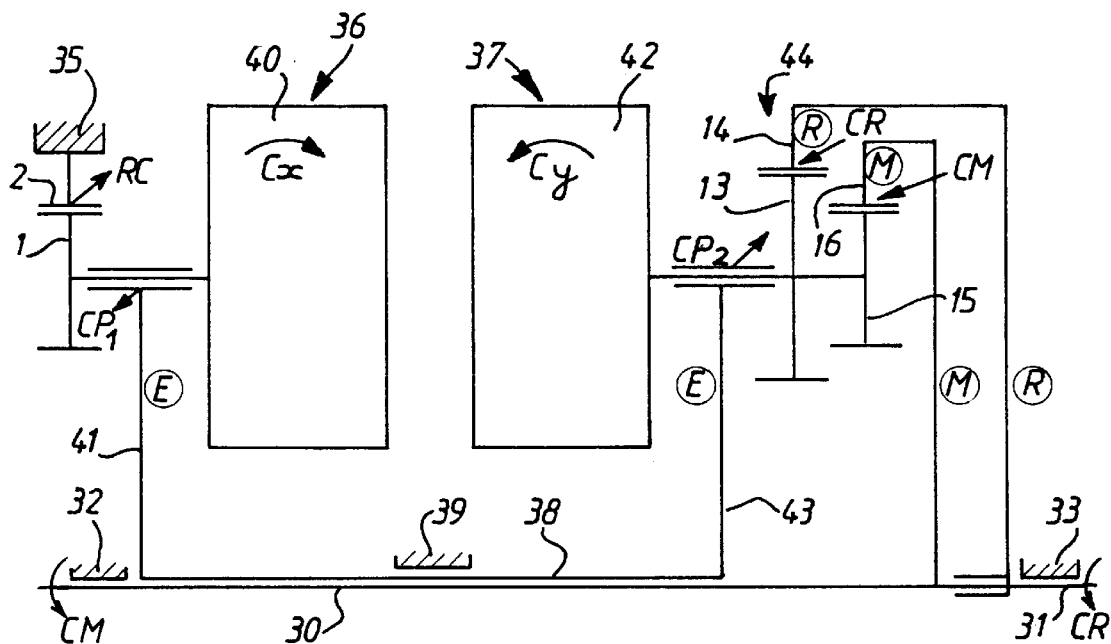
FIG.1
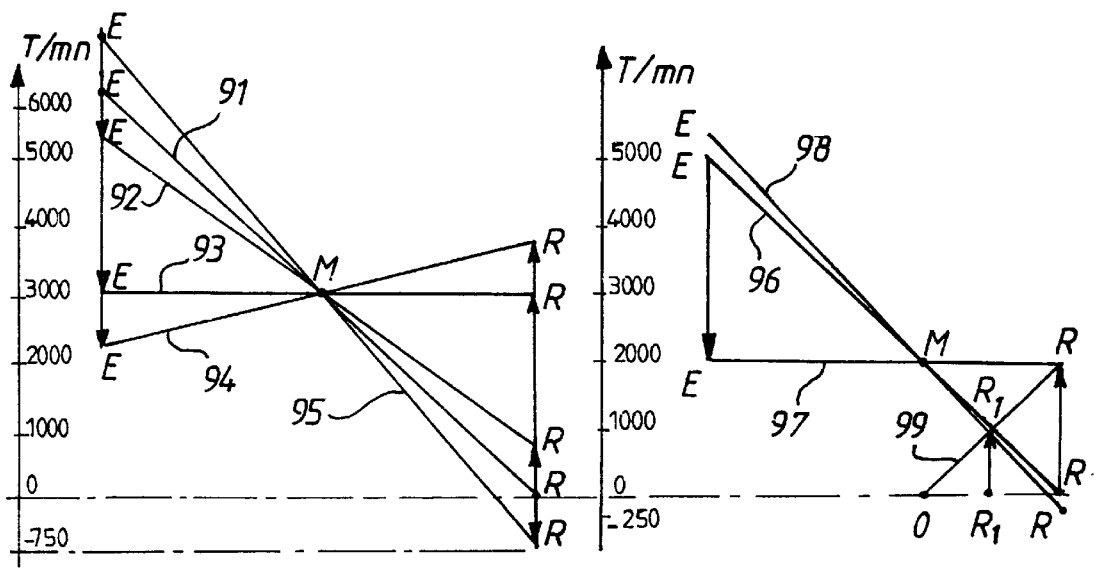
FIG.9
FIG.11

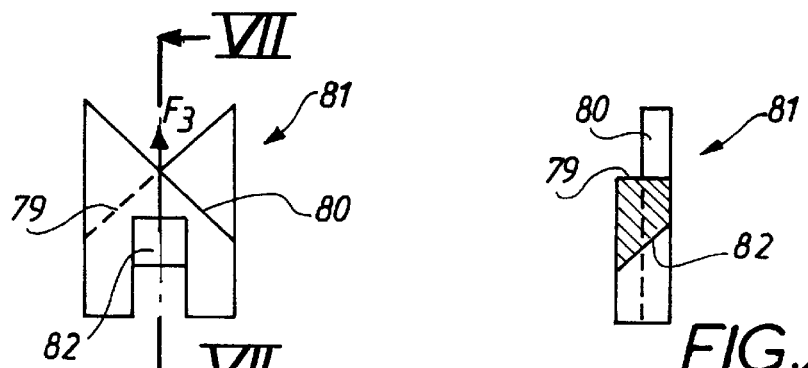
FIG.6
FIG.7
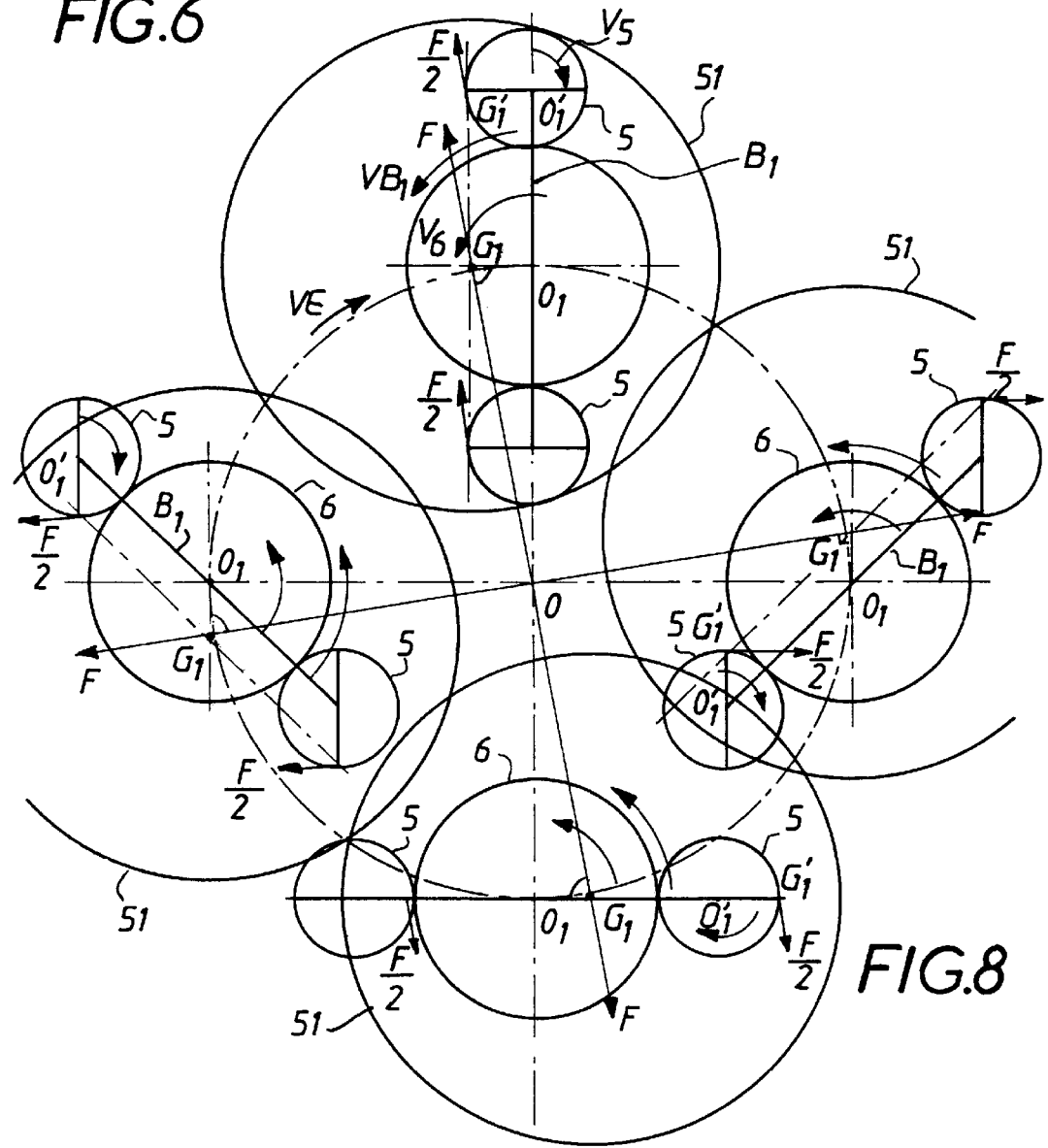
FIG.8

AUTOMATIC CONTINUOUSLY VARIABLE POSITIVE MECHANICAL TRANSMISSION WITH ADJUSTABLE CENTRIFUGAL ECCENTRIC WEIGHTS AND METHOD FOR ACTUATING SAME

The present invention relates to an automatic continuously variable positive mechanical transmission, comprising an input shaft, an output shaft, a point of support connected to a transmission case, a positive kinematic link provided with a planetary gear train unit and linking the input shaft, the point of support and the output shaft, and torque compensation means comprising eccentric weights subject to centrifugal forces which produce torques on two sets of planet wheels of the planetary unit. The invention also relates to a method for actuating such a transmission.

By the term positive kinematic link, we wish to designate here any link between moving or fixed parts by means of a positive engagement with cooperating shapes, preferably gears, but also other means with similar effects such as chains and toothed belts.

BACKGROUND OF THE INVENTION

Such a transmission is in particular usable in motor, rail or other vehicles, but also to drive any kind of variable speed machines, for example winches, ventilating fans, compressors, farmiing or public works machines, crushers, weaving machines, as well as to drive constant speed machines such as generators using wind power engines or variable speed turbines.

To drive motor vehicles, a standard type automatic transmission comprises a switchable gearbox, preceded by a fluffy torque converter. The latter presents losses of energy. At the present time, we are seeking to reduce these losses by adding a high gear clutch, as well as a power by-pass via a positive transmission channel arranged parallel to the converter. To make such a transmission work automatically and perfectly, an electronic control device is necessary. All these means further increase the complexity, the weight and the construction and maintenance costs.

This is why we are seeking to replace these transmissions by mechanisms of other types, which are continuously variable over the whole range of speeds of the output shaft, to avoid using a switchable gearbox. One known solution uses a variable speed belt and pulley drive with a variable diameter. These variable speed drives can have an automatic setting system based on the centrifugal force. However, the belt transmits the loads by friction and that always implies losses of energy and overheating problems which limit the application of these transmissions to the field of lower power outputs. Furthermore, there is always a risk of the belt slipping.

Moreover, we know of mechanical couplings allowing a difference in speed between the input shaft and the output shaft, due to a centrifugal torque compensation device which acts on a differential gear linking the input shaft to the output shaft. The patent GB-A-995305 describes a coupling of this type, where the planet wheels of the planetary differential gear each carry a secondary planetary gear train formed by a secondary planet wheel carrier integral with the main planet wheel four secondary planet wheels each provided with an eccentric weight, and a secondary planet pinion designed to hold each weight in a constant position in relation to the direction of the centrifugal force it is subject to, so that this force creates a centrifugal torque which is as even as possible while the unit rotates. A manual control device can act on the position of each secondary planet wheel to select one of four positions of the weights, i.e. in the respective positions of forward drive, neutral, reverse drive and lock against overdrive. In an alternative, the secondary planet wheels are replaced by a set of articulated levers carrying mobile weights which create a centrifugal torque on the main planet wheel. This is a complicated and delicate construction which is not suitable for transmitting high torques at high speeds. Above all, the major drawback inherent in such couplings is that they can not operate as torque converters, because there is no point of support or reaction point on a fixed part, for example a case. This is why they can not apply a torque greater than the input torque to the output shaft, whatever the speed of the output shaft.

The patent FR-A-842 760 describes a transmission of the kind mentioned in the preamble to claim 1. This device known under the name of Hobbs transmission actually operates like a torque converter, due to a bearing pressure on the case which makes it possible to multiply the torque when the output speed is low. The device comprises eccentric weights on planet wheels of two planetary gear trains which are centered on the common axis of the input and output shafts. During one revolution of a planetary gear train, the centrifugal forces produce varying centrifugal torques, i.e. which change direction because of the rotation of the planet wheels. This results in varying pulses, of which those in a positive direction are selected by a freewheel device which transmits them to the output shaft via an elastic or inertia device, which smooths the pulsed output torque. As freewheel devices do not at all withstand such varying or pulsed torques at a high frequency, which is of the same order of magnitude as the speeds of the input and output shafts, transmissions of this kind have not been able to break through in actual pratice.

The object of the present invention is to create an automatic continuously variable transmission which makes it possible to avoid the above-mentioned drawbacks of prior transmissions. The invention relates in particular to a continuous transmission entirely positive, avoiding any transmission of energy by friction or by a flow of fluid, which is capable of transmitting high and continuous torques in a wide output shaft speed range, particularly for the applications for driving vehicles, or conversely in a wide input shaft speed range if the output shaft has to rotate at a constant speed.

SUMMARY OF THE INVENTION

According to the invention, this problem is overcome by a transmission of the kind mentioned in the preamble, characterized:

in that the first and the second set of planet wheels are carried by a common planet wheel carrier, in that the first set of planet wheels cooperates with at least one toothing forming said point of support and that it is associated with a first centrifugal device with eccentric weights;

in that the second set of planet wheels cooperates with sun wheels linked to the input shaft and the output shaft respectively and in that it is associated with a second centrifugal device with eccentric weights, in that each of the two centrifugal devices comprises, on each planet wheel of the first and second set, a secondary planetary gear train whose secondary planet wheels carry the eccentric weights and rotate around themselves at a speed equal to that of the common planet wheel carrier, and in that the eccentricity of the weights is adjustable while operating.

Due to this principle, we obtain both a continuous variation of the transmission ratio, and therefore the speed of the output shaft, over the whole range from zero to the maximum speed, and at the same time the working torque is multiplied on the output shaft due to the bearing pressure on the case like a fluffy torque converter does, but without the drawbacks of such a device. Due to the entirely positive kinematic link, which can be provided by toothed wheels which are always in attack, the transmission according to the invention constitutes an entirely mechanical torque converter, where the only losses of energy are the usual losses by gearing and in the bearings, with the result that efficiency is very close to 1 at all speeds.

The fact that the secondary planet wheels linked to a weight rotate around themselves at the same speed as the main common planet wheel carrier is essential, because it makes it possible to keep the lever arm of the centrifugal force in a direction which is approximately perpendicular to this force, with the result that the centrifugal torque produced by each weight does not change direction and remains totally constant for a given eccentricity, as shall be described later on. There is therefore no varying or pulse torque on the output side of the positive kinematic link and we can do without the freewheel devices and the elastic or inertia devices of the Hobbs type transmissions.

The fact that the eccentricity of the weights is adjustable while operating, makes it possible to permanently set the case's reaction torque to the value necessary to overcome the load torque of the output shaft.

In a particularly advantageous embodiment of the transmission, the latter comprises means designed to automatically set the eccentricity of the weights according to the speed of the common planet wheel carrier. Preferably, said means to set the eccentricity comprise a control device mounted on the common planet wheel carrier and actuated by the centrifugal force. This transmission can furthermore comprise an external control acting on the eccentricity control device superposed on the centrifugal force.

In a preferred embodiment, the variation in the eccentricity of the weights according to the speed of the common planet wheel carrier differs in the two centrifugal devices, the transmission being in so-called direct drive where the eccentricity is zero in the first device and not zero in the second device.

Preferably, each secondary planetary gear train comprises a single eccentric weight, which is mounted slidably and pivotably on at least two planet wheels of this planetary gear train. Consequently, the weight produces the same centrifugal torque on each secondary planet wheel and, due to symmetry, this torque is constant over a complete revolution of the centrifugal device. The eccentricity control device can be common to both centrifugal devices.

In a special embodiment, each secondary planetary gear train in the first centrifugal device comprises a part forming a secondary planet wheel and a part forming a secondary planet wheel carrier, said parts being mounted coaxially on the common planet wheel carrier with each cooperating directly or indirectly, with at least one toothing forming a point of support on the case and imposing a fixed gear ratio on them. Similarly, each secondary planetary gear train in the second centrifugal device comprises a part forming a secondary planet wheel and a part forming a secondary planet wheel carrier, said parts being linked to one another by means of pinions which impose a fixed gear ratio on them.

To form a transmission which has a relatively small diameter, the first and the second centrifugal device can be arranged one behind the other in the direction from a common center axis of the input and output shafts.

However, to form a short transmission, the first and the second centrifugal device can be arranged substantially in the same radial plane with respect to a common center axis of the input and output shafts, the planet wheels of the first set being placed between the planet wheels of the second set.

According to another aspect, the invention relates to a method for actuating a transmission such as defined above, characterized in that the speed of the output shaft is compared with the speed of the input shaft, in that a maximum eccentricity is given to the weights for a minimum value of the output shaft, and in that the eccentricity of the weights is reduced when the speed of the output shaft approaches that of the input shaft. When the speed of the output shaft is substantially equal to that of the input shaft, the eccentricity of the weights is set to a zero value in the first centrifugal device and to a predetermined reduced value in the second centrifugal device. If the speed of the output shaft exceeds that of the input shaft, the eccentricity of the weights can be set to a value which is reversed in the first centrifugal device and to a value less than said predetermined reduced value in the second centrifugal device.

This makes it possible to progressively reduce the case's reaction torque according to the falling load torque, which translates into an increase in speed of the output shaft. In pratice, the setting can be based on measurements of the speeds or the torques of both shafts, by means of appropriate sensors.

BRIEF DESCRIPTION OF THE DRAWING(S)

The present invention and its advantages shall be more clearly understood in the following description of an embodiment and two alternatives, with reference to the accompanying drawings, in which:

FIG. 1 is a simplified schematic view showing a transmission according to the invention in its principle, FIG. 2 is a diagram similar to FIG. 1, showing in greater detail a first preferred embodiment of a transmission in compliance with the principle in FIG. 1, FIG. 3 is a partial cutaway axial view along the line III—III in FIG. 4, showing weights mounted with a variable eccentricity on pairs of secondary planet wheels of the two centrifugal devices belonging to the transmission in FIG. 2, and also showing a common control device to control the variable eccentricity of the two weights shown, FIG. 4 is a partial cutaway view along the line IV—IV in FIG. 3, FIG. 5 is a partial cutaway view along the line V—V in FIG. 4, FIG. 6 is an axial view of a slide block in the eccentricity control device, FIG. 7 is a cutaway view along the line VII—VII in FIG. 6, FIG. 8 is a diagram showing the kinematics of an eccentric weight in a transversal plane of the transmission during a revolution around the center axis, FIG. 9 is a Ravigneaux type diagram showing the speeds of the input and output shafts and the common planet wheel carrier of the planetary unit in the transmission in FIG. 2, FIG. 10 is a cutaway longitudinal view of the upper half of a transmission built according to FIG. 2, FIG. 11 is a Ravigneaux type diagram for an alternative to the transmission in FIG. 2, designed to transmit a greater power output, FIG. 12 is a diagram similar to the one in FIG. 2, showing a second preferred embodiment of a transmission according to FIG. 1, for medium and low power outputs, and FIG. 13 is a Ravigneaux type diagram for the transmission in FIG. 12.

DESCRIPTION OF THE PREFERRED EMBODIMENTS

Figure 2:
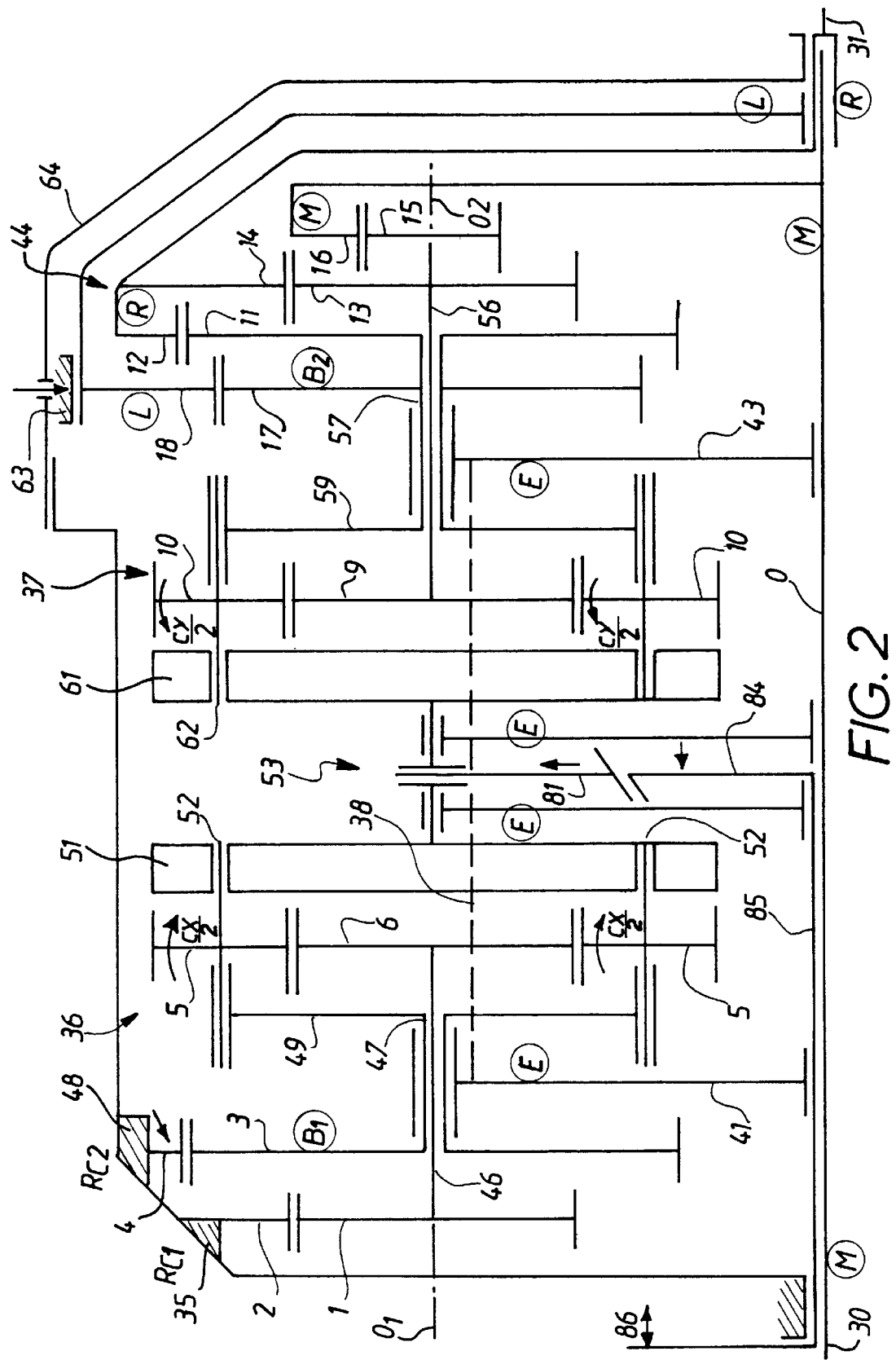
Figure 3:
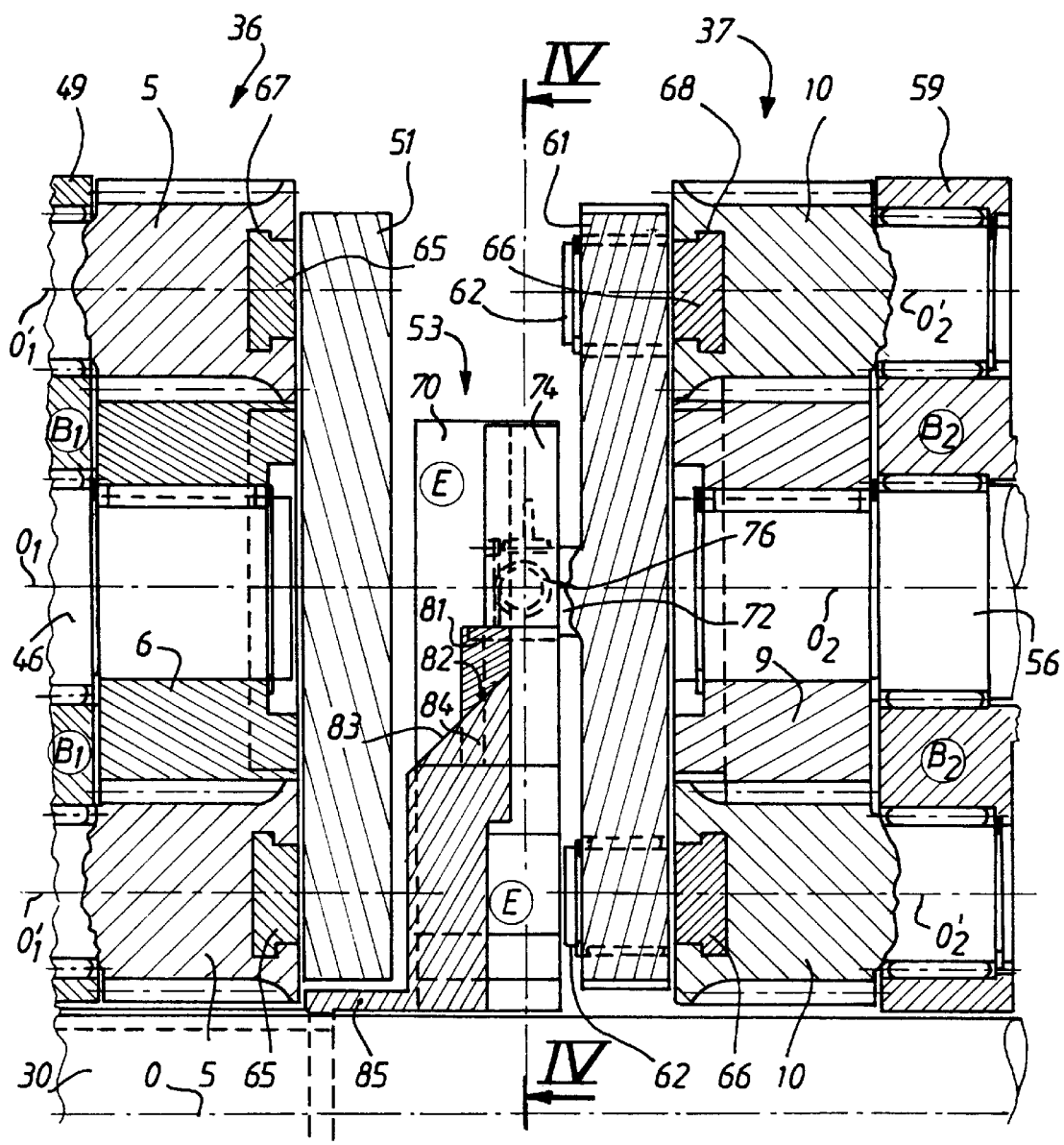
Figure 4:
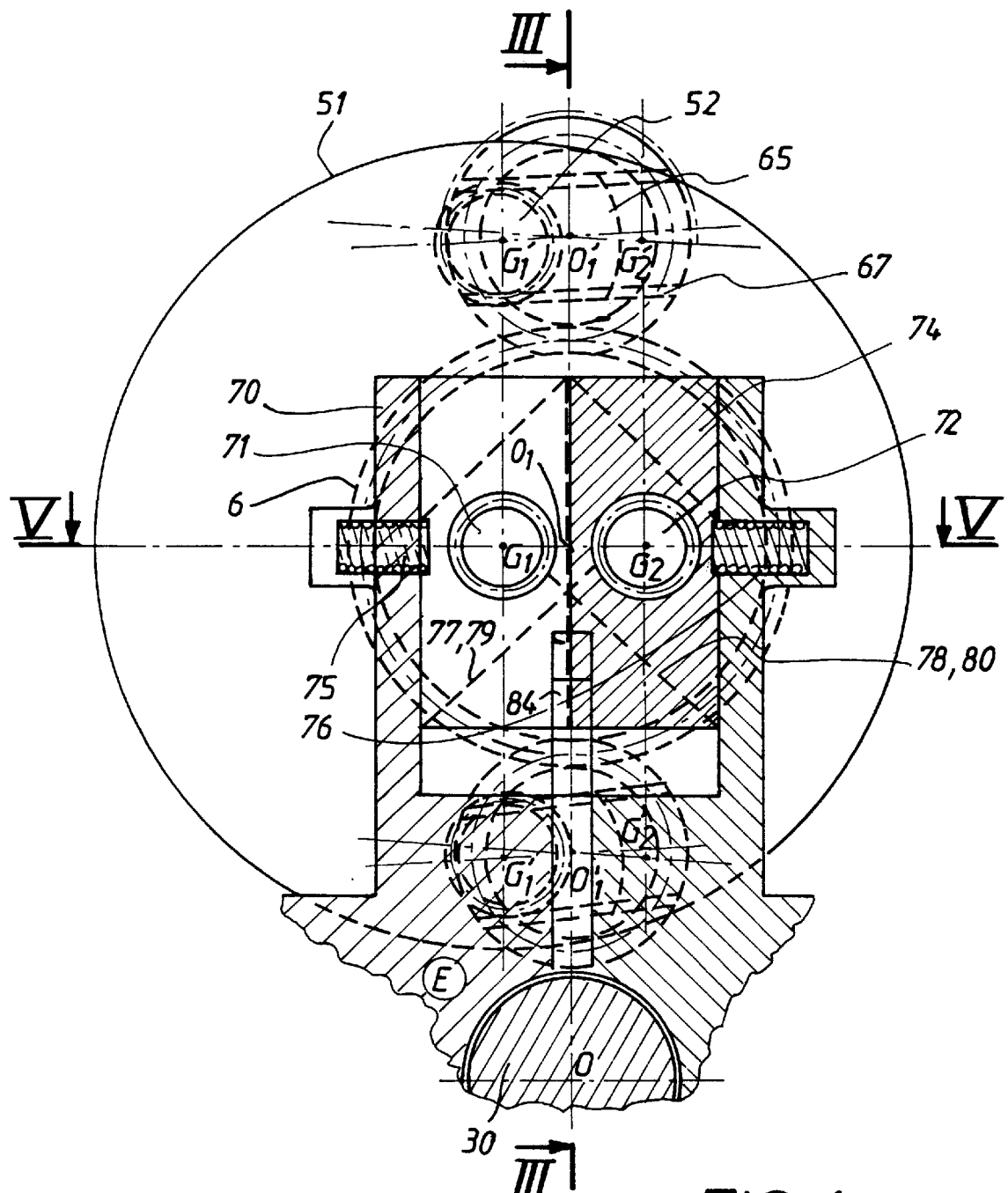

The transmission illustrated schematically in FIG. 1 comprises an input shaft 30 and an output shaft 31 extending on one from the other and supported in a case (not shown) by bearings 32 and 33. A positive kinematic link is made between a point of support 35 on the case and each of the shafts 30 and 31 by means of two planetary centrifugal devices 36 and 37 which interact with one another and are linked by linking parts 38 such as longitudinal arms or an intermediate hollow shaft which encompasses the input shaft 30. This shaft can be supported by an intermediate bearing 39 and/or by the input shaft 30. To be more precise, the first planetary centrifugal device 36 comprises several centrifugal parts 40, two in the present case, which shall be described in detail later on, each of which apply a centrifugal torque Cx on one of the two (or more) planet wheels 1 supported by a planet wheel carrier 41 and engaging an internal ring gear 2 linked to the point of support 35. Similarly, the second planetary centrifugal device 37 comprises two centrifugal parts 42 applying a centrifugal torque Cy on one of the two pairs of planet wheels 13 and 15 supported by a planet wheel carrier 43 which is linked to the planet wheel carrier 41 by the shaft 38. The planet wheels 13 engage a ring gear 14 linked to the output shaft 31. The planet wheels 15 have a smaller diameter than the planet wheels 13; they engage a ring gear 16 linked to the input shaft 30. The pinions 13 to 16 and the planet wheel carrier 43 form a planetary gear train 44 which provides a positive driving link between the input shaft 30, transmitting a torque CM, and the output shaft 31 transmitting a load torque CR, and ensures the balance between these two torques by means of a case reaction torque RC, i.e.: RC+CM+CR=0. The first centrifugal device 36 rests on the case at point 35 to transmit the torque RC to the second centrifugal device 37 via the shaft 38, i.e. RC=−CP$_1$. The second planetary device 37 permanently balances the working torque CM, the load torque CR and the reaction of the case RC transmitted by the shaft 38, i.e. CP$_2$=−CP$_1$=RC. This balance is ensured at all speeds by the centrifugal device 37, the principle of design of which is symmetrical to that of the device 36. The variation in speed of the output shaft 31 is automatically controlled by the balance of the torques according to the variation in the load torque CR.

FIGS. 2 to 10 illustrate in greater detail a first embodiment of a transmission according to FIG. 1. In addition to the parts already shown in FIG. 1, it can be seen in FIG. 2 that each of the two planet wheels of device 36 (positioned 180° from one another) comprises a planet wheel shaft 46 with an axis O$_1$, rotating on the planet wheel carrier 41 and integral with pinions 1 and 6. The differential pinion 1 engages the ring gear 2 linked to the point of support 35 which applies a reaction torque RC$_1$. A hollow shaft 47 mounted coaxially around the shaft 46 is integral with another differential pinion 3 which engages a ring gear 4 linked to a second point of support on case 48 applying a reaction torque RC$_2$. The reaction RC mentioned above is equal to RC$_1$+RC$_2$. The shaft 47 is also integral with a planet wheel carrier 49 carrying two opposed differential pinions 5 which engage the pinion 6 to form a partial secondary planetary gear train centered on the axis O$_1$, which rotates around the center axis O of the input shafts 30 and output shafts 31. A weight 51 is supported by the two secondary planet wheels 5, by means of respective pivots 52 the eccentricity of which on the corresponding planet wheel 5 is variable and creates a centrifugal torque Cx/4 on each planet wheel 5. This variable eccentricity is controlled by means of a control device 53 mounted on the main planet wheel carrier 41.

The design of the second planetary centrifugal device 37 is similar, but positioned symmetrically with respect to that of the first device 36. Their two planet wheel carriers 41 and 43 are made integral by several longitudinal linking arms 38. Each of the two planet wheels of the device 37 comprises a planet wheel shaft 56 with axis O$_2$ which, in the present example, is aligned on axis O$_1$. However, this alignment condition is not obligatory. The shaft 56 is fitted with differential pinions 13 and 15 which have already been mentioned, as well as with a pinion 9. A hollow shaft 57 mounted coaxially around the shaft 56 is integral with a planet wheel carrier 59 carrying two opposed planet wheels 10 which engage the pinion 9 to form a partial secondary planetary gear train of the centrifugal device 37. A weight 61 with variable eccentricity is mounted on the planet wheels 10 by means of the pivots 62, similar to the weight 51. Its variable eccentricity is also controlled by means of the control device 53, but it is never equal to that of the weight 51.

The hollow shaft 57 furthermore carries a differential pinion 11 which engages a ring gear 12 linked to the ring gear 22 and the output shaft 31, and a differential pinion 17 which engages a ring gear 18 belonging to a reverse drive device. The ring gear 18 is likely to rotate around the center line O, but also be locked for the reverse drive by means of a brake 63 resting on a case part 64 in the transmission.

To facilitate the description of how the transmission operates, the main parts have been given letters in FIGS. 1 and 2:

M: input shaft 30, ring gear 16
R: output shaft 31, ring gears 12 and 14
B$_1$: pinion 3, shaft 47, secondary planet wheel carrier 49
B$_2$: pinions 11 and 17, shaft 57, secondary planet wheel carrier 59
E: planet wheel carrier 41 and 43, linking part 38
L: ring gear 18 of the reverse drive device.

The rotation speeds of these parts shall be designated by VE, VR, etc, representing relative speeds for the parts E, R, etc. with respect to the speed VM=1 of the input shaft 30 (primary shaft).

The position of the weights 51 and 61, with their common eccentricity control device 53, is shown in greater detail in FIGS. 3 to 7. In the present example, each weight 51 is in the shape of a circular plate (FIG. 4), with a center of gravity G$_1$ located in the middle between the centers G'$_1$ of its two pivots 52. Each weight is a similar shape, with a center of gravity G$_2$ located in the middle between the centers G'$_2$ of its two pivots 62. Each pivot 52, 62 is mounted by means of a bearing in the weight 51, 61. It is integral with a pad 65, 66 which can slide in a T-shaped radial groove 67, 68 of the corresponding planet wheel 5, 10. As shall be described later on, the radii of the pitch circles of the pinions of the centrifugal devices 36 and 37 are determined in such a way that the speed of rotation of the secondary planet wheels 5 and 10 is always equal to that of the part E making up the common planet wheel carrier at the two devices 36 and 37. Consequently, the orientation of the grooves 67 and 68 of the secondary planet wheels remains constant in relation to the part E, therefore in relation to the predominant centrifugal forces due to this part rotating around the axis O. In other words, the shape of the triangle $O_1$, $O'_1$, $G'_1$ (FIG. 4) does not vary, for a given eccentricity, during the rotation of the planetary gear train formed by the pinions 5 and 6. Likewise, in the other centrifugal device 37, the shape of the triangle $O_2$, $O'_2$, $G'_2$ does not vary, for a given eccentricity, during the rotation of the planetary gear train formed by the pinions 9 and 10.

The kinematic conditions set out above are illustrated by FIG. 8, which shows four successive positions of one of the two centrifugal parts 40 in the first centrifugal device 36 during a revolution around the center line O at the speed of rotation VE of the common planet wheel carrier E. In the secondary planetary gear train, the planet wheel carrier $B_1$ of which is shown by a bold line and rotates at the speed $VB_1$ around the axis $O_1$, the planet wheel 6 rotates at a speed V6 and the secondary planet wheels 5 carrying the weight 51 rotate around themselves at a speed V5 which is equal to VE by geometrical construction. This is why each segment $O_1'G_1'$, representing the eccentricity of the weight 51, always forms a constant angle with the radial segment $OO_1$, therefore also a constant angle with the centrifugal force F acting on the center $G_1$ of the weight. This force is evenly distributed F/2 on the two planet wheels 5 and it applies the same centrifugal torque Cx/4 to each of them. As the distance $OG_1$ does not vary during a revolution, the force F and the centrifugal torque Cx are also constant; they only vary when the speed VE and/or the eccentricity of the weight vary. In the second centrifugal device 37, the design is the same, such that the centrifugal torque Cy is also constant over one revolution. The result is that in steady duty all the torques are constant in the transmission.

Referring to FIGS. 3 to 7, it can be seen that the eccentricity control device 53 for the two weights 51 and 61 positioned face to face is carried by a hollow radial arm 70 of the part E. Each weight 51, 61 comprises a center journal 71, 72 which is mounted by a needle bearing in a slide block 73, 74 mounted slidably in the arm 70 and prompted by a compression spring 75, 76 in a tangential direction, therefore perpendicular to $OO_1$. Each slide block 73, 74 presents a ramp 77, 78 preferably inclined to 45° in relation to the radial direction $OO_1$ and resting while sliding on a corresponding inclined plane 79, 80 of a radial slide block 81 mounted in the arm 70. This slide block 81 is shown in an axial view in FIG. 6 and a cutaway view in FIG. 7. When the part E rotates, the slide block undergoes a centrifugal force $F_3$ which, by resting between the inclined planes 79, 80 and the ramps 77, 78, tends to push the slide blocks 73, 74 against the springs 75, 76, therefore imposing an eccentricity on the weights 51 and 61 which is determined by the balance between $F_3$ and the force of the springs, such that it normally depends on the single functional parameter VE.

However, a control device for increasing the eccentricity is provided for, to move away from said balance position. With this aim in mind, an axially inclined ramp 82 is positioned in the middle of the slide block 81 and cooperates with a ramp 83 of an eccentric 84 which can slide axially in the part E under the effect of an axial pull control 85 which emerges on the outside of the case. The eccentric 84 acts in the same manner and simultaneously on the eccentricity of the other weights of the two centrifugal devices 36 and 37. If the pull control 85 is moved to the left according to FIGS. 2 and 3 by means of an external control device 86 (FIG. 1), the eccentricity of the weights is increased; if the pull control is released, the balance described above is reestablished automatically by the return springs 75, 76. The pull control 85 can be placed along the input shaft 30.

Using the diagram in FIG. 2, a specialist will be able to write the following balance conditions, where Ri represents the radius of the pitch circle of the toothed wheel bearing the reference number i:

$$Cx = +CM\left[\frac{R1^*R3^*R5}{R6(R1^*R4 - R2^*R3)}\right] + CR\left[\frac{R1^*R3^*R5}{R6(R1^*R4 - R2^*R3)}\right] \quad (1)$$

$$Cy = -CM\left[\frac{R10^*R11^*R14^*R15}{R9^*R16(R12^*R13 - R11^*R14)}\right] - \quad (2)$$

$$CR\left[\frac{R10^*R11^*R13}{R9(R12^*R13 - R11^*R14)}\right]$$

The equality of the speeds V5 and V10 of the secondary planet wheels and VE of the main planet wheel carrier is determined by the following equations:

$$R2^*R3^*R6 - R1^*R4^*(R6+R5) = 0 \quad (3)$$

$$R9^*R11^*R4 - R12^*R13(R9+R10) = 0 \quad (4)$$

To clearly explain how the transmission operates and in particular point out the relative speeds of the various parts, we shall refer to practical values of the radii of a transmission's various toothed wheels according to FIG. 2, designed to transmit a working torque CM of 200 Nm at 3000 rpm whereas the load torque CR varies from −800 to −160 Nm at a speed of 750 to 3750 rpm. The geometrical radii Ri are shown in millimeters in table I, i representing the reference number of each wheel.

TABLE I

| | | |
|---|---|---|
| R1 = 26.18 | R9 = 27 | R15 = 11.077 |
| R2 = 98.18 | R10 = 13.5 | R16 = 83.077 |
| R3 = 48 | R11 = 48 | R17 = 40.5 |
| R4 = 120 | R12 = 120 | R18 = 112.5 |
| R5 = 13.5 | R13 = 26.18 | |
| R6 = 27 | R14 = 98.18 | |

The result is that $OO_1 = OO_2 = R16 - R15 = 72$ mm. With these values, table II shows the speeds V of the various rotating parts, in relative values in relation to the speed VM of the input shaft 30, for various relative speeds VR of the output shaft 31. VR (i.e. VR/VM for VM=1) therefore also represents the transmission ratio, as well as the reverse of the torque's conversion factor CR/CM if the losses of energy are disregarded.

Equations (1) and (2) become:

$$Cx = -(\tfrac{2}{5})CM - (\tfrac{2}{5})CR \quad (5)$$

$$Cy = +(\tfrac{1}{5})CM + (\tfrac{2}{5})CR \quad (6)$$

TABLE II

| Part | VR = 0 | VR = 1/4 | VR = 1/2 | VR = 3/4 | VR = 1 | VR = 5/4 |
|---|---|---|---|---|---|---|
| E | 0 | +7/4 | +3/2 | +5/4 | 1 | +3/4 |
| |Device 36 | +2 | | | | +1 | |
| 1 and 6 | −11/2 | −77/16 | −33/8 | −55/16 | −11/4 | −33/16 |
| 5 | +2 | +7/4 | +3/2 | +5/4 | +1 | +3/4 |
| B1 | −3 | −21/8 | −9/4 | −15/8 | −3/2 | −9/8 |
| Device 37 | | | | | | |
| 9, 13 and 15 | −11/2 | −31/8 | −9/4 | −5/8 | +1 | +21/8 |
| 10 | +2 | +7/4 | +3/2 | +5/4 | +1 | +3/4 |
| B2 | −3 | −2 | −1 | 0 | +1 | +2 |

It can be seen that the speeds of the parts 5 and 10 carrying the weights are always equal to those of E, which always keeps the centers of gravity of the weights in the position described above. It can also be noted that, in the present example, the mass of each weight 51, 61 with the associated slide block is 742 g whilst that of the slide block 81 is 39 g.

FIG. 9 is a well known so-called Ravigneaux type diagram, illustrating on the Y-axis the relative speeds of certain parts of the planetary gear trains of the first and second centrifugal device, and on the X-axis the ratios from the Willis equation linking the speeds of the various parts of a planetary gear train.

Three points in a line E, M and R represent, for each operating condition, the speeds of parts E, M and R of the planetary gear train 44 linking the input and output shafts. The speed of part M comprising the input shaft 30 is considered to be constant to simplify things and it serves as a reference. Part L of the reverse drive device is also linked to this train, its representative point is also in line with the other three. The linear relation between the speeds is as follows:

$$(VM-VE)/(VR-VE)=+(R14*R15)/(R13*R16)=+\tfrac{1}{2}$$

When starting, part R integral with the output shaft is stationary, which the point R on the horizontal line V=0 in FIG. 9 shows. The speed of the input shaft integral with M is brought up to the engine's optimum speed, for example 3000 rpm, using the clutch placed between the engine and the transmission. This speed shall then be kept constant, as will be the working torque CM, although it is possible to make one or the other vary by means of the accelerator. The common planet wheel carrier E is then driven at a speed VE=+2 according to table II and according to the straight line 91 in FIG. 9. The result is that the slide block 81 of the control device 53 undergoes a centrifugal force and imposes maximum respective eccentricities on the weights, which are 8 mm for the weights 51 and 9.33mm for the weights 61. A maximum torque Cx is then created in the centrifugal device 36, and a slightly greater torque Cy in the centrifugal device 37. Once the output shaft 31 has started and its speed VR reaches ¼ VM on the straight line 92 in FIG. 9, i.e. CR=−800 Nm, Cx=+6/5*CM=240 Nm and Cy=−7/5*CM=−280 Nm, i.e. with two planet wheels Cx=120 Nm and Cy=−140 Nm. At this stage, the return springs 75 are compressed to 450 N (taking into account a 10% friction coefficient) and the return springs 76 to 800 N. The torque Cx has a chain reaction on all the wheels of the first centrifugal device 36 to balance the reaction of the case with the torque applied to the planet wheel carrier E: $CP_1$=−RC, with RC=$RC_1$+$RC_2$. It is at its maximum in the condition shown by the straight line 91, i.e. when VR=0.

This is the reaction torque RC which will be transmitted by part E to the second centrifugal device 37, where all the driving power passes, whereas the first centrifugal device 36 is only used to transmit the case's reaction.

In the second centrifugal device 37, the centrifugal torque Cy due to the weights 61 has a chain reaction on all the wheels of the second centrifugal device 37 to balance the torques CR+CM+$CP_2$=0, i.e. CR+CM+RC=0. The output torque CR applied to the output shaft 31 is then at its maximum and makes this shaft start, driving a vehicle for example. The speed of R can for example reach 750 rpm at the end of the gear engaging phase, which corresponds to the line 92 in FIG. 9 and the column VR=¼ in the table II. At this stage, with the dimensions given above as an example, the torque CR applied to the output shaft is four times the working torque CM.

The speed VR of the resisting part R then increases (in the direction of the arrows in FIG. 9) according to the reduction in the load torque CR, if need be until VR=VM, in the condition shown by the straight line 93, where all the parts of the second device 37 and all its pinions rotate in one single block.

During this phase when R increases speed, the eccentricity of the weights 51 of the first centrifugal device 36 continues to progressively decrease as VR increases. When VR reaches VM, the eccentricity of the weights 51 is zero, therefore Cx=0, All the torques are zero in the first device 36 and part E no longer transmits any torque to the second device 37, as RC=0.

However, the weights 61 still have a residual eccentricity for VR=VM, thus creating a centrifugal torque Cy=−⅕*CM which balances the torques in the second device 37 all the parts of which rotate at the speed VM. The weights 61 then play the role of fixed unbalanced masses. As the pinions no longer roll over one another, when VR=VM, the transmission is then in direct drive and its energy efficiency is practically equal to 1. Of course, this condition can exist for any engine speed VM, with a load torque CR equal and opposite CM.

If the load torque CR becomes lower than the working torque CM, the direction of the case's reaction torque RC reverses, the speed VR of the output shaft becomes greater than VM. We are then in "overdrive", the transmission ratio being greater than 1. As FIG. 9 shows, the speed VE becomes lower than VM. The center of gravity $G_1$ of each weight 51 then switches to the other side of the radial axis $OO_1$. The torque Cx changes direction, RC becomes negative and is added to CR to equal CM. The center of gravity $G_2$ of each weight 61 remains on the same side of $OO_2$ as before, but approaches $O_2$. The engine can act as an engine brake at all speeds if it's power supply is reduced, like with a standard gearbox. If the load torque increases again, the phenomena described above are automatically reversed again. The driver of a vehicle equipped with such an automatic transmission can therefore drive without acting on the transmission, by simply using the accelerator pedal to set the running speed by using the engine's.

However, the driver can also be given the means to increase the acceleration by simulating a kick down or increase the engine brake at will using the reaction torque RC, by means of a manual control or a basic electronic control, acting on the pull control 85 to modify the law of variation for the eccentricity of the weights in relation to the load torque.

To actuate the reverse drive, the brake 63 simply has to be applied to lock part L, such that point L is placed on the horizontal line V=0 in FIG. 9. The condition of the output planetary gear train is then shown by the straight line 95, where the point R is below V=0 for any positive speed of M. The speed VR of the output shaft varies automatically according to the load torque like in forward drive, but in a range of shorter ratios.

All that is therefore required to control this transmission is a two-position lever, i.e. forward drive and reverse drive, the eccentricity of the weights being set automatically according to the output speed VR. The additional control device (FIG. 2) to act upon the eccentricity in another way is optional.

With the numerical values given in table I and a rated input torque from 200 Nm at 3000 rpm, i.e. a cruising speed power rating of approximately 63 KW which can be that of a middle-of-the-range car, the volume of the transmission arranged according to FIG. 2, where the two centrifugal devices 36 and 37 are positioned one behind the other, has a diameter in the region of 300 mm and is approximately 350 mm long. These values are lower than those of a standard automatic transmission with a fluffy torque converter and a four-speed planet gearbox. The only friction part is the reverse drive brake 63, which never operates in friction but only to lock L.

It is also possible to obtain a shorter design if the two sets of centrifugal parts 40 and 42 (FIG. 1) of devices 36 and 37 are positioned in the same transversal plane, due to the fact that they have a common planet wheel carrier 41 and 43 forming part E. The volume of the transmission then corresponds to a diameter of approximately 380 mm and a length of about 250 mm for the example in the previous paragraph. Of course the number of planet wheel centrifugal parts 40, 42 can differ, for example three parts in each centrifugal device 36, 37 so that we have main planetary gear trains with three planet wheels.

Figure 10:
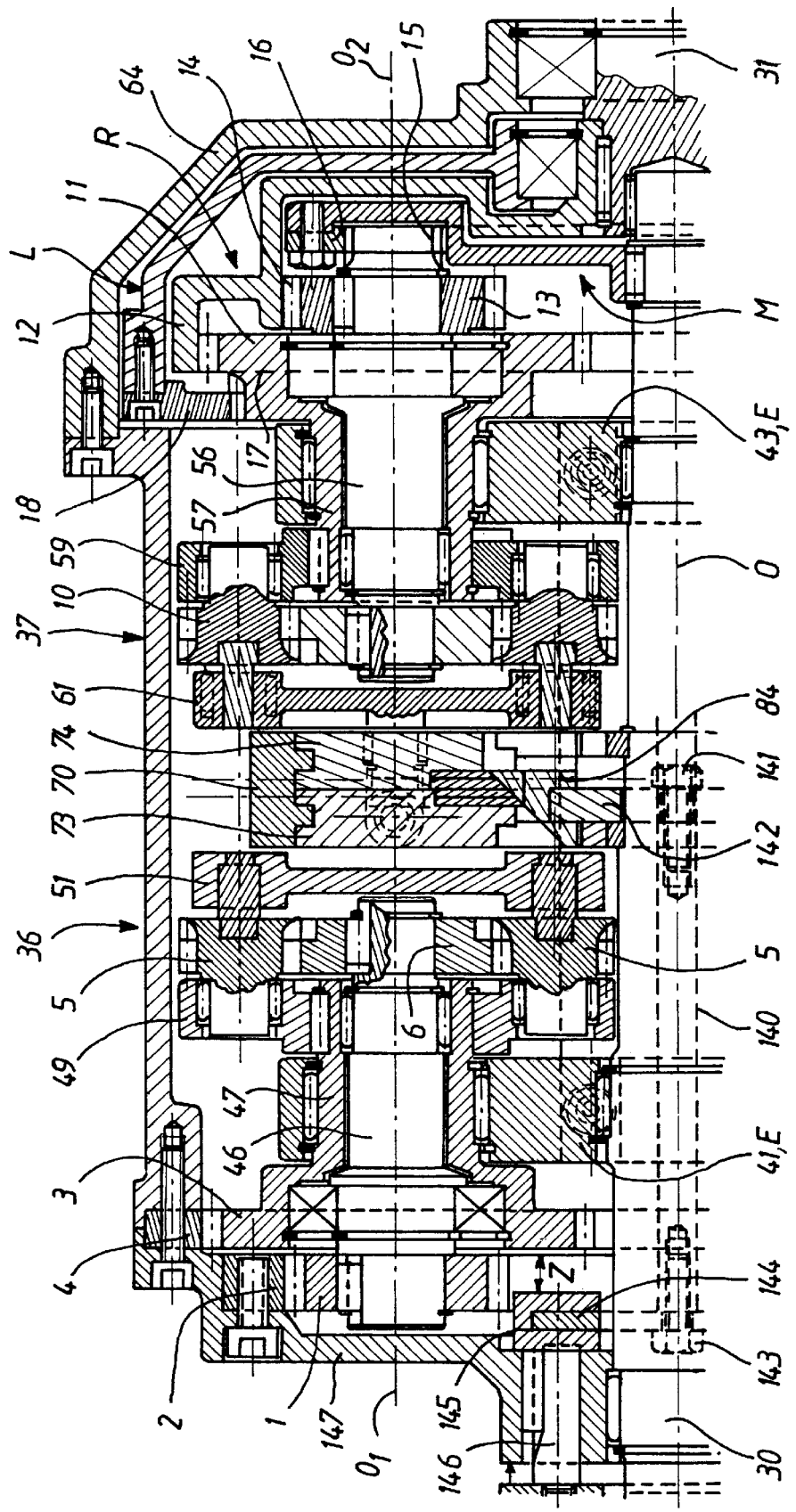

FIG. 10 shows, by way of example, in a longitudinal cutaway view, the design of the transmission described above with reference to FIGS. 2 to 9. The parts illustrated schematically in FIG. 2 can be seen, with the same reference numbers. Furthermore, we can see that the axial pull control 85 actuating the eccentrics 84 in the common planet wheel carrier E comprises two axial arms 140 positioned either side of the input shaft 30 and secured by bolts 141 to a ring-shaped part 142 supporting the two opposed eccentrics 84. The other end of each arm 140 is secured by a bolt 143 to a ring-shaped disk 144 which rotates (at the speed of part E) in a fork 145 carried by a control rod 146 able to slide with a Z travel in a cap 147 on the case. This rod is actuated by the external control device 86 mentioned with reference to FIG. 2.

FIG. 11 is a Ravigneaux diagram illustrating an alternative transmission according to the invention which corresponds to the diagram in FIG. 2, but with different dimensions to transmit greater power outputs, for example in a heavy diesel engine vehicle with an optimum speed VM of 2000 rpm. In this case, each centrifugal device 36, 37 comprises four centrifugal parts 40, 42, therefore four main planet wheels mounted at 90° and four eccentric weights 51, 61. Taking into account the application for heavy vehicles, it is intended that the output shaft 31 drive the wheels through a planet reducing gear unit controlled separately by the driver, to ensure either a direct drive, or an additional ½ gear ratio reduction for slow running mode. With such a unit, the transmission ensures a continuous variation in the running speed and the torque conversion speed in a range from 1 to 8.

The values of the radii in table I can be replaced by those in table III below, the value $OO_1$ being equal to 115.5 mm.

TABLE III (in mm)

| R1 = 42    | R9 = 44     | R15 = 22     |
|------------|-------------|--------------|
| R2 = 157.5 | R10 = 22    | R16 = 137.5  |
| R3 = 77    | R11 = 77    | R17 = 71.46  |
| R4 = 192.5 | R12 = 192.5 | R18 = 196.66 |
| R5 = 22    | R13 = 42    |              |
| R6 = 44    | R14 = 157.5 |              |

With these values, the centrifugal torques required are given by the following equations:

$$Cx = -(2/5)*CM - (2/5)*CR \quad (7)$$

$$Cy = +(9/25)*CM + (2/5)*CR \quad (8)$$

The values of the speeds in relation to VM are given in table IV.

TABLE IV

| Part | VR = 0 | VR = 1/4 | VR = 1/2 | VR = 3/4 | VR = 1 |
|------|--------|----------|----------|----------|--------|
| E    | +5/2   | +17/8    | +7/4     | +11/8    | +1     |

TABLE IV-continued

| Device 36   |        |         |        |         |       |
|-------------|--------|---------|--------|---------|-------|
| 1 and 6     | −55/8  | −187/32 | −77/16 | −121/32 | −11/4 |
| 5           | +5/2   | +17/8   | +7/4   | +11/8   | +1    |
| B1          | −15/4  | −51/16  | −21/8  | −33/16  | −3/2  |
| Device 37   |        |         |        |         |       |
| 9, 13 and 15| −55/8  | −157/32 | −47/16 | −31/32  | +1    |
| 10          | +5/2   | +17/8   | +7/4   | +11/8   | +1    |
| B2          | −15/4  | −41/16  | −11/8  | −3/16   | +1    |

In the Ravigneaux diagram in FIG. 11, the straight lines 96, 97 and 98 correspond to the straight lines 91, 93 and 95 in FIG. 9. The straight line 99 linking the points O, $R_1$ and R represents the effect of the reducing gear which, when it is on the ½ ratio drives a transmission shaft $R_1$ at half the speed VR of the output shaft 31.

With a working torque of 1800 Nm at 2000 rpm, such a transmission can deliver an output torque which varies from −14400 to −1800 Nm for speeds of 250 to 2000 rpm.

Figure 13:
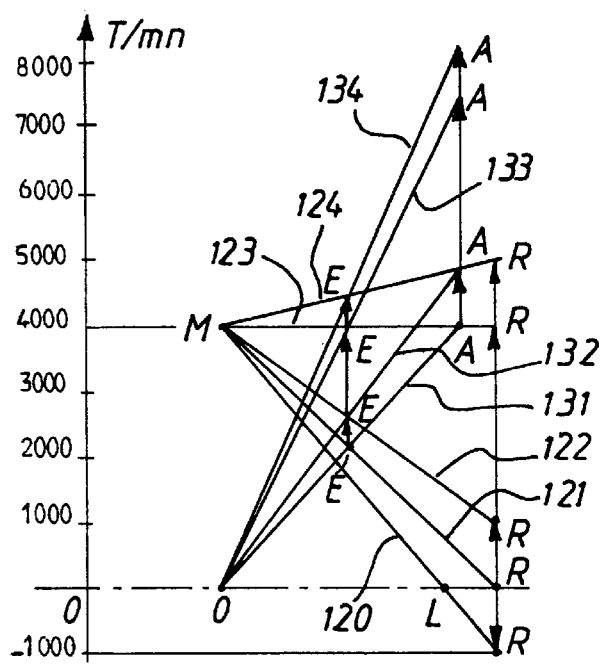
Figure 5:
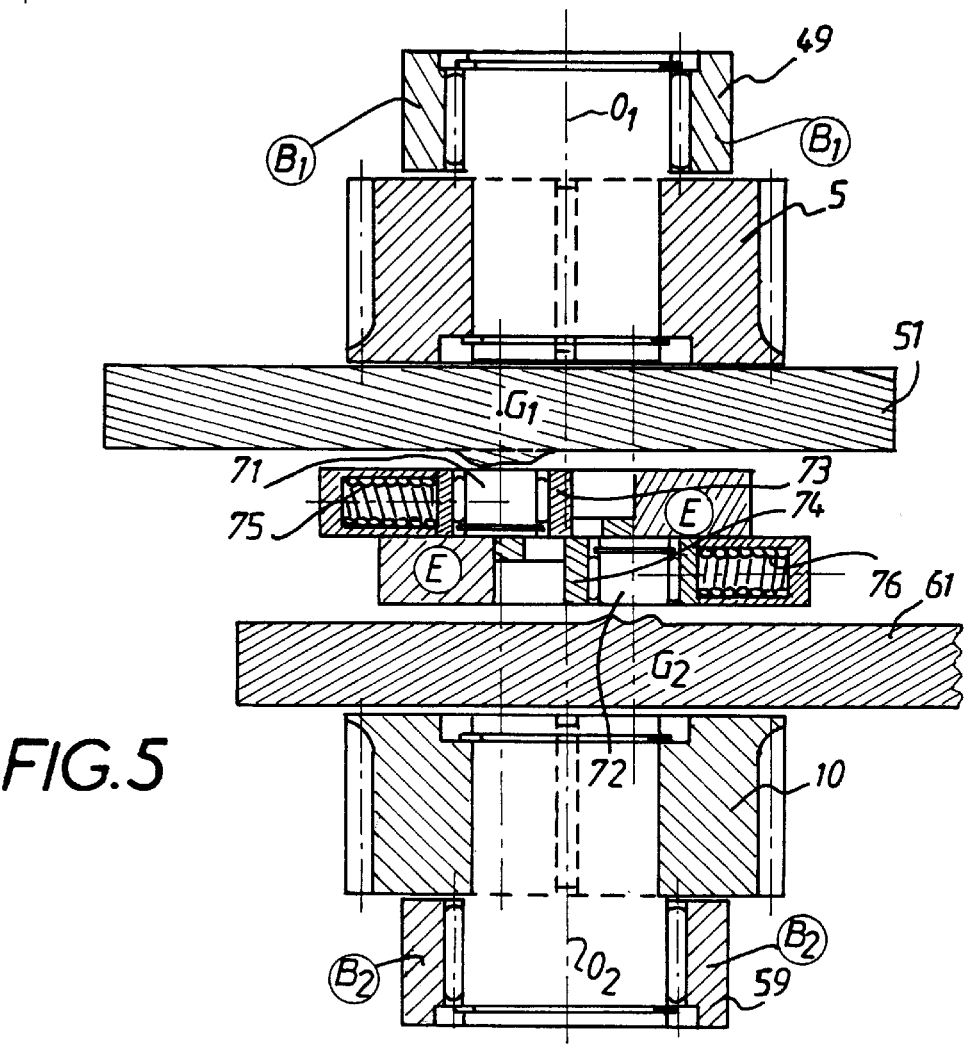
Figure 12:
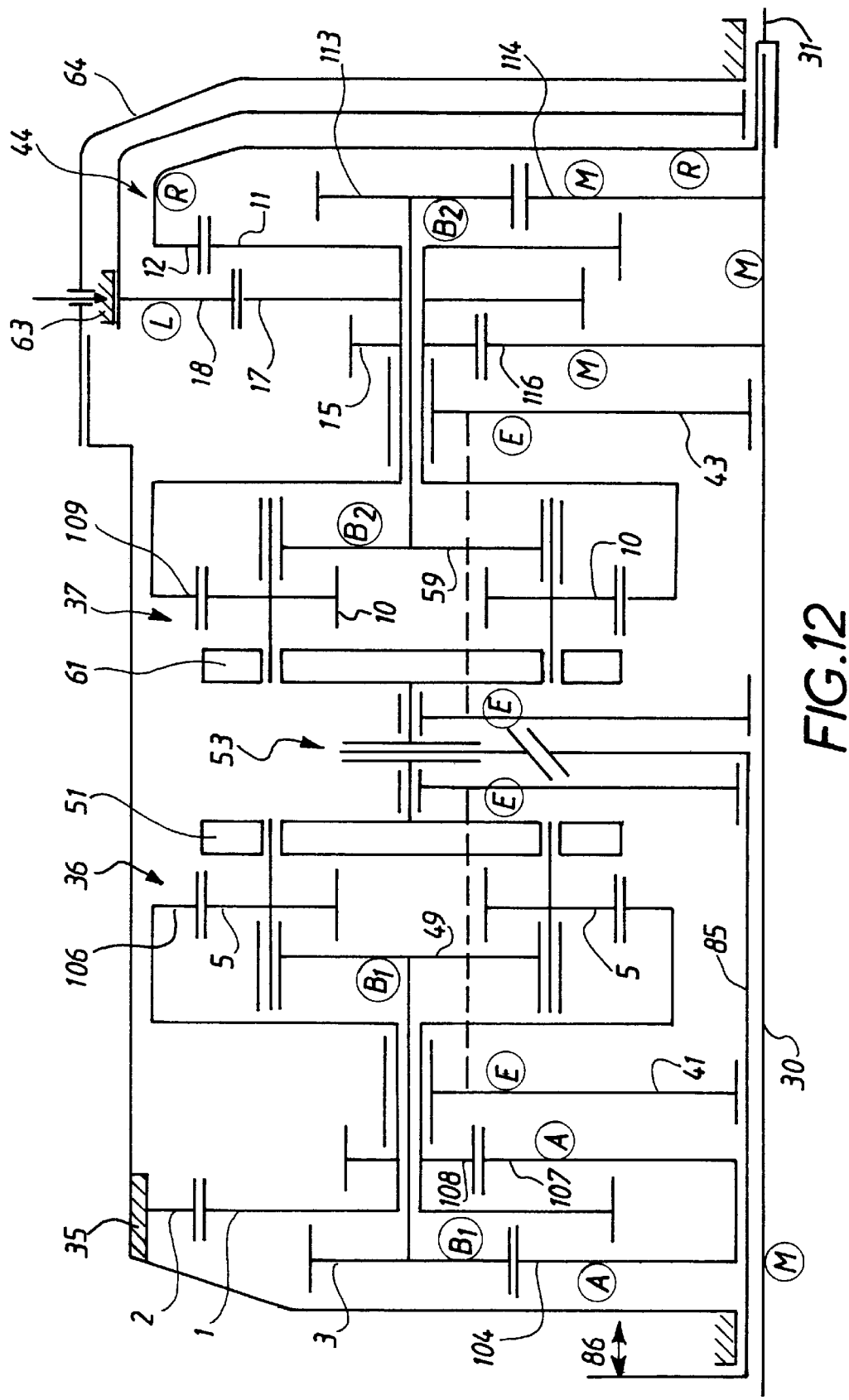

FIGS. 12 and 13 illustrate another embodiment of a transmission according to the principle in FIG. 1, designed to transmit small to medium power outputs. We shall only describe the differences with the diagram in FIG. 2. In this case, there is only one point of support 35 on the case, to transmit the reaction torque CR on the pinion 1 of each main planet wheel of the first centrifugal device 36. This pinion 1 is integral with a ring gear 106 replacing the pinion 6. The second point of support 48 in FIG. 2 is replaced by a link between the pinion 3 and a pinion 108 integral with wheels 1 and 106, due to a centered part A which has planet pinions 104 and 107 which engage respectively the pinions 3 and 108.

The position of the weights 51 and 61 and the eccentricity control device 53 is similar to that in FIGS. 2 to 8.

In the second centrifugal device 37, a ring gear 109 replaces the pinion 9 and it is driven by the drive part M by means of a planet pinion 116 replacing the ring gear 16. The secondary planet wheel carrier 59 is integral with a pinion 113 which is driven by a pinion 114 of part M.

With this arrangement, the torques' balance conditions become:

$$Cx = -CM\left[\frac{R1^*R3^*R5^*R107}{R2^*R106(R104^*R108 - R3^*R107)}\right] - CR\left[\frac{R1^*R3^*R5^*R107}{R2^*R106(R104^*R108 - R3^*R107)}\right] \quad (9)$$

$$Cy = -CM\left[\frac{R10^*R15^*R113}{R109(R15^*R114 - R116^*R113)}\right] + CR\left[\frac{R10^*R11^*R116^*R113}{R12^*R109(R15^*R114 - R116^*R113)}\right] \quad (10)$$

and the equality of the speeds V5 and V10 of the secondary planet wheels and VE of the main planet wheel carrier is determined by:

$$R104^*R108(R106 - R5) - R3^*R107^*R106 = 0 \quad (11)$$

$$R15^*R114(R109 - R10) - R109^*R116^*R113 = 0 \quad (12)$$

In a practical example where the center distances of axes $OO_1 = OO_2 = 72$ mm, the values of the radii of the toothed wheels are given in millimeters below:

| | |
|---|---|
| R1 = R11 = 48 | R106 = R109 = 48 |
| R2 = R12 = 120 | R107 = R116 = 54 |
| R3 = R113 = 13.1 | R108 = R15 = 18 |
| R104 = R114 = 58.9 | R17 = 29.5 |
| R5 = R10 = 16 | R18 = 101.5 |

The equations (9) and (10) become:

$$Cx = -(4/15)CM - (4/15)CR \quad (13)$$

$$Cy = -(2/9)CM + (4/15)CR \quad (14)$$

The Ravigneaux diagram in FIG. 13 is based on the relations between speeds:

$$VE = (6/11)VM + (5/11)VR$$

$$VA = (11/6)VE$$

It illustrates the relative speeds given in the table above, in relation to VM considered as constant (for example 4000 rpm) in forward drive. The straight lines 121 and 131 correspond to VR=0, the straight lines 122 and 132 to VR=¼, the straight lines 123 and 133 to VR=1 (direct drive) and the straight lines 124 and 134 to VR=5/4 (overdrive). The straight line 120 corresponds to reverse drive when the brake 63 locks part L.

It has to be noted that we can also use a transmission according to the invention with the aim of driving the output shaft 31 at a constant speed by means of the input shaft 30 rotating at a variable speed, generally lower than or equal to that of the output shaft, but which is able to be greater in certain cases. A typical application of this kind in encountered in driving generators at a predetermined synchronism speed, using a variable speed machine such as a water or wind turbine, or during electric regenerative braking in an electrically driven vehicle.

The description of the examples above clearly shows that the invention provides a totally mechanical positive automatic transmission, as it only has toothed wheels, which are permanently in attack. It is automatic and continuous as it is the load torque which controls the variation in speed and transmission ratio. It can furthermore offer various programmes or operating modes if it is equipped with an electronic control device for the eccentricity of the weights.

I claim:

1. An automatic continuously variable positive mechanical transmission comprising:

a transmission case (64) supporting an input shaft (30), an output shaft (31) and defining a point of support (35, 48);

a positive kinematic link comprising a first planetary gear train (44) linking the input shaft to the output shaft, said positive kinematic link being at least partially supported by said point of support (35, 48);

torque compensation means comprising eccentric weights (51, 61) subject to centrifugal forces for producing torque on a first set of planet wheels and a second set of planet wheels in the first planetary gear train;

wherein the first set of planet wheels and the second set of planet wheels are carried by a common planet wheel carrier (E);

the first set of planet wheels (1, 3) engages with at least one toothing (2, 4) which forms said point of support (35, 48), said first set of planet wheels is influenced by a first centrifugal device (36) being provided with eccentric weights (51);

the second set of planet wheels (11, 13, 15) engages with planet wheels (12, 14, 16) linked respectively to the input shaft (30) and to the output shaft (31) and is coupled with a second centrifugal device (37) being provided with eccentric weight (61);

said first and second centrifugal devices (36, 37) comprise, on a planet wheel of the first and the second sets of planet wheels, a secondary planetary gear train (5, 6, 49; 9, 10, 59), and secondary planet wheels (5, 10) of each secondary planetary gear train are linked to the eccentric weights (51, 61) and rotate at a speed equal to that of the common planet wheel carrier (E); and the eccentricity of the weights are adjustable during operation of the automatic continuously variable positive mechanical transmission.

2. The transmission according to claim 1, further comprising means (53) for automatically setting the eccentricity of the weights (51, 61) according to a speed of the common planet wheel carrier (E).

3. The transmission according to claim 2, wherein said means for automatically setting the eccentricity comprise a control device (53) mounted on the common planet wheel carrier (E) and influenced by centrifugal force during operation of the automatic continuously variable positive mechanical transmission.

4. The transmission according to claim 3, further comprising an external control device (85, 86) which is coupled to the eccentricity control device (53) to facilitate control of the eccentricity of the weights.

5. The transmission according to claim 2, wherein the eccentricity of the weights (51, 61) varies according to the speed of the common planet wheel carrier (E), and the eccentricity of the weights (51, 61), during operation of the automatic continuously variable positive mechanical transmission, are different from one another.

6. The transmission according to claim 1, wherein each secondary planetary gear train (5, 6, 49; 9, 10, 59) comprises a single eccentric weight (51, 61) which is slidably and pivotably mounted on at least two planet wheels (5, 10) which form the secondary planetary gear train (5, 6, 49; 9, 10, 59).

7. The transmission according to claim 3, wherein the eccentricity control device (53) is connected to both of the first and second centrifugal devices (36, 37).

8. The transmission according to claim 1, wherein the secondary planetary gear train (5, 6, 49, 106) of the first centrifugal device (36) comprises a first part (1, 6, 46; 1, 106) forming a secondary planet wheel (6, 106) and a second part (3, 47, 49) forming a secondary planet wheel carrier (49), said first and second parts are mounted coaxially with one another on the common planet wheel carrier (E) and each cooperates with at least one toothing (2, 4) forming the point of support (35, 48) on the transmission case to impose a fixed gear ratio of the first and second parts.

9. The transmission according to claim 1, wherein the second planetary gear train (9, 10, 59, 109) of the second centrifugal device (37) comprises a first part (9, 13, 15, 56; 109, 11, 15, 17) forming a secondary planet wheel (9, 109) and a second part (11, 17, 57, 59; 113, 59) forming a secondary planet wheel carrier (59), said first and second parts are linked to one another by pinions (12, 14; 114, 116) to impose a fixed gear ratio on the first and second parts.

10. The transmission according to claim 1, wherein the first and the second centrifugal devices (36, 37) are positioned one behind the other along a direction of a common axis (O) of the input and the output shafts (30, 31).

11. The transmission according to claim 1, wherein the first and the second centrifugal devices (36, 37) are positioned substantially in the same radial plane in relation to a common axis (O) of the input and the output shafts (30, 31), and the planet wheels of the first set are located between the planet wheels of the second set.

12. A method of actuating an automatic continuously variable positive mechanical transmission having eccentric weights (49, 50, 59, 60) subject to centrifugal forces which produce a torque on a first set of planet wheels and a second set of planet wheels, said method comprising the steps of:

comparing a speed of an output shaft (31) with a speed of an input shaft (30);

allowing a maximum positive eccentricity to the weights (49, 50, 59, 60) for a minimum value of a speed of the output shaft; and reducing the eccentricity of the weights when the speed of the output shaft approaches that of the input shaft.

13. The method according to claim 12; further comprising the step of, when the speed of the output shaft is substantially equal to that of the input shaft, setting the eccentricity of the weights to a value of zero in a first centrifugal device (36) and setting the eccentricity of the weights to a predetermined reduced value in a second centrifugal device (37).

14. The method according to claim 13, further comprising the step of, for a speed of the output shaft exceeding that of the input shaft, setting the eccentricity of the weight in the first centrifugal device (36) to a position which is on an opposite side of a radial axis and setting the eccentricity of the weight in the second centrifugal device (37) to a value which is less than said predetermined reduced value.

* * * * *